July 19, 1938.    E. M. WAYLAND    2,124,381
MEANS FOR DRYING FRUIT
Filed July 18, 1934    4 Sheets-Sheet 4

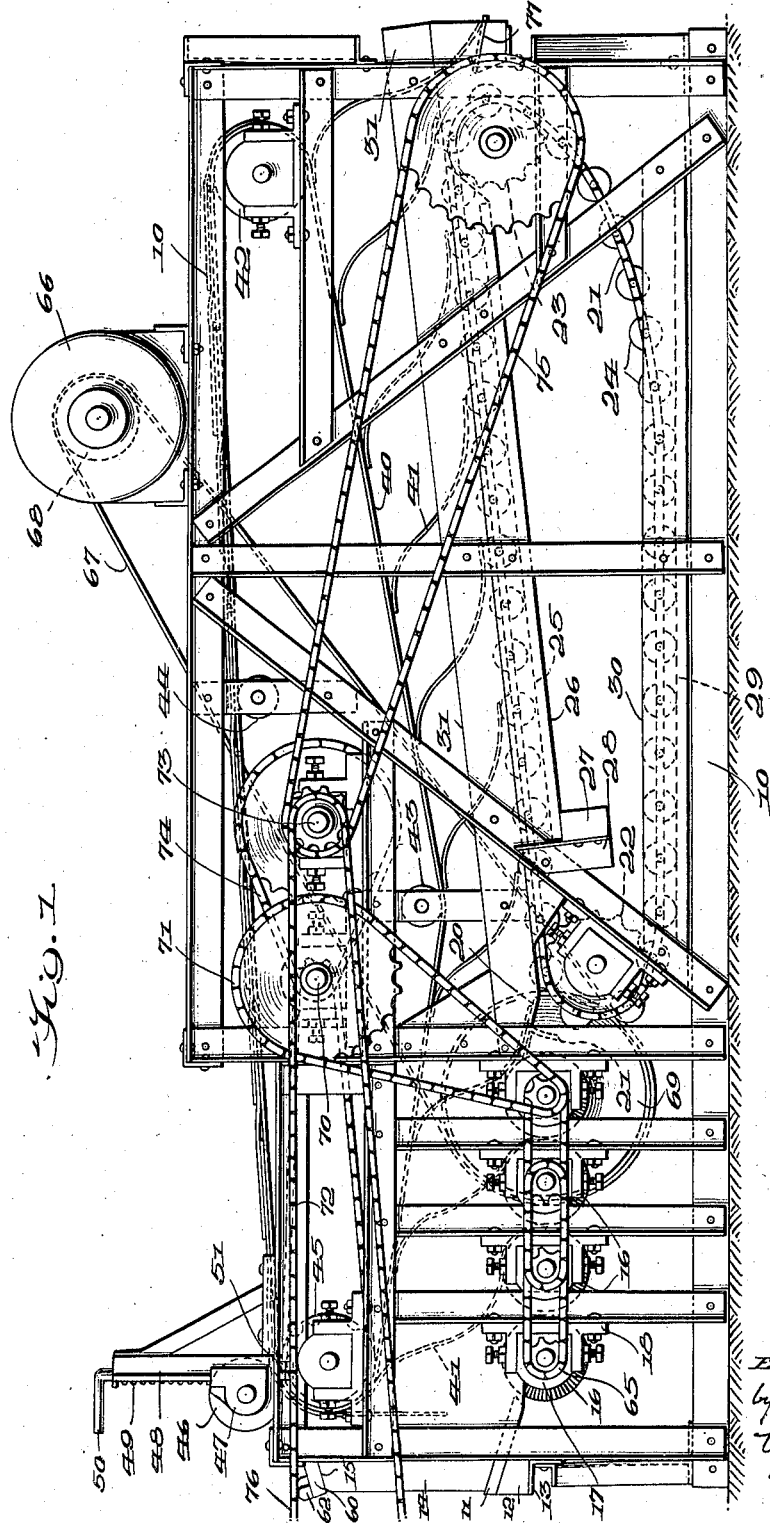

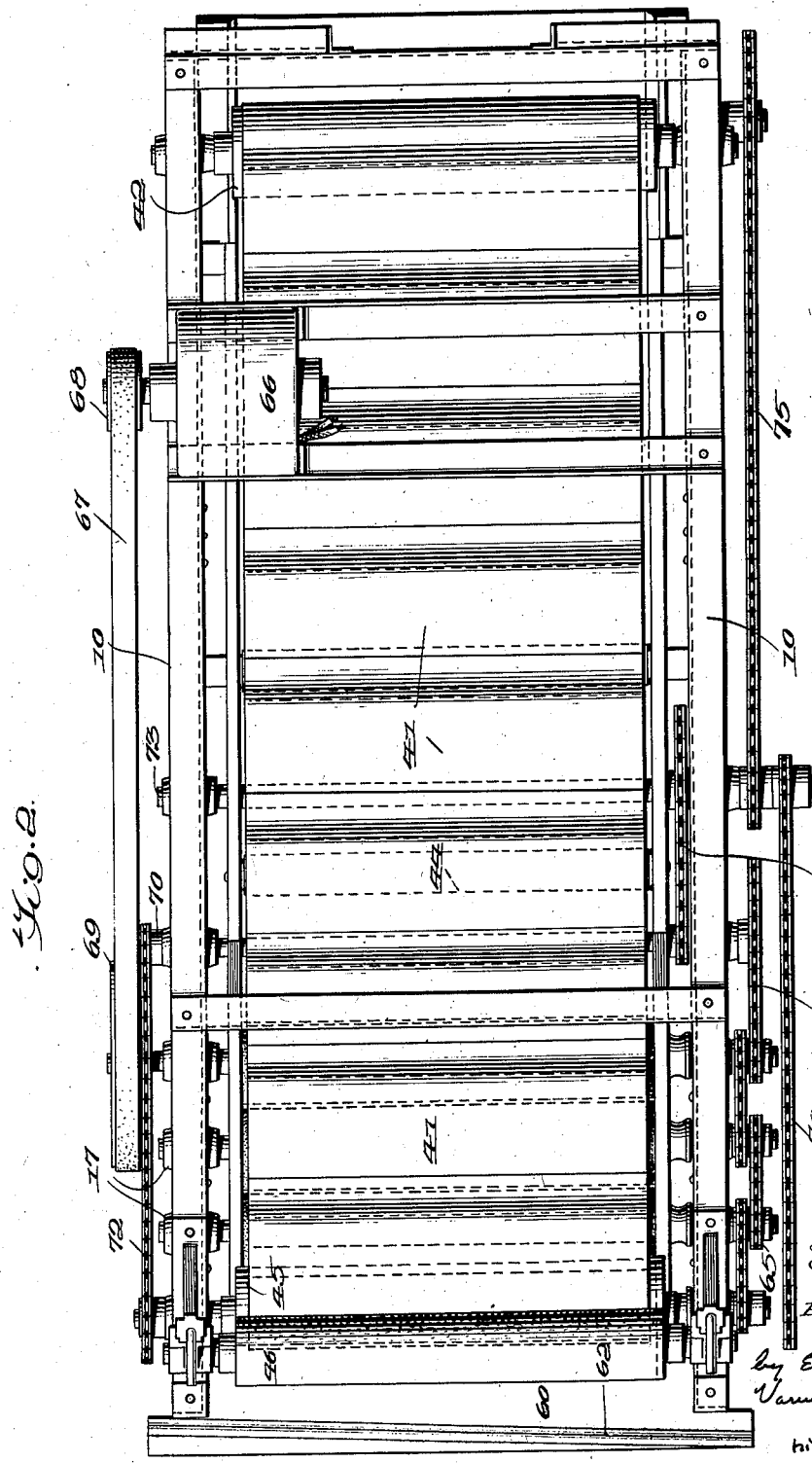

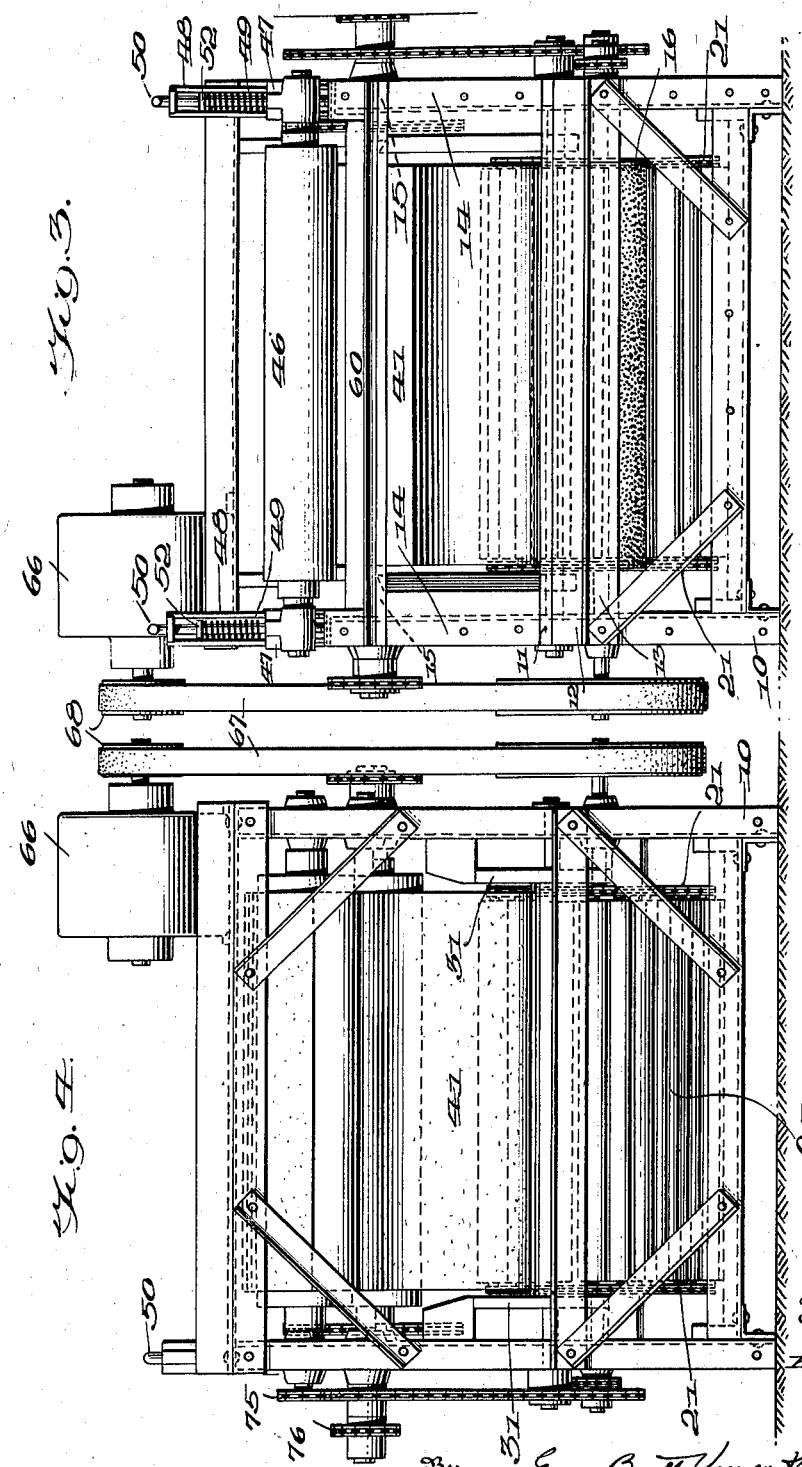

Inventor
Edwin M. Wayland,
By Emery Booth Varney & Holcombe,
his Attorneys

Patented July 19, 1938

2,124,381

UNITED STATES PATENT OFFICE 2,124,381

MEANS FOR DRYING FRUIT

Edwin M. Wayland, Covesville, Va.

Application July 18, 1934, Serial No. 735,886

4 Claims. (Cl. 34—1)

This invention relates to the art of surface-drying whole fruit and aims generally to improve the same.

Particular objects of the invention are to attain improved surface-drying of fruit integers by providing a new drying method and novel means for carrying out the same; to enable more economical construction of the drying means and better utilization of space in the packing house by effecting the drying in a reduced length of run as compared with existing practices; to effect satisfactory drying of the calyx and stem ends of fruits having the same, in a new and more economical manner than has heretofore been used; and to attain rapid and effective surface-drying of soft or tender fruits such as certain varieties of apples, while avoiding bruising of the same.

Other objects and advantages of the invention reside in the provision of a fruit drying method and machine of large capacity for the space required, and in certain details of construction of parts and method steps and combinations thereof, as appears from the detailed description hereinafter of a preferred embodiment of method and means according to the invention.

Many attempts have heretofore been made to effect surface drying of fruit integers after washing the same, by methods and machines involving wiping of the fruit integers with toweling; evaporation of the moisture therefrom by heat or by dry or warm air streams; blowing of moisture drops therefrom by air jets and like practices, but such practices and combinations thereof as have been employed have not been thoroughly satisfactory.

Other drying methods have required excessive space in the packing house where sufficient space is not always available. Others have required excessive power in their operation, rendering them uneconomical. Others have bruised or otherwise damaged the fruit. And others, and particularly those intended to effect drying of the stem and calyx recesses, have been unsatisfactory because of the non-uniform results obtained on various fruit integers, and because in some instances, they have tended to drive the washing fluids more deeply into the fruit instead of removing the same, producing increased tendency toward core rot.

To avoid these difficulties of the prior art I have turned away from the principles heretofore employed and have developed a new method and machine inherently free from them. Thus my new method which is preferably practiced in two drying stages, for the first time applies in this art the principle of centrifugal force to effectively remove the greater part of the liquid from the stem and calyx recesses and to discharge from the cheeks of the fruit the larger drops of liquid, thus disposing of all "drippable" moisture at once and avoiding tracking of the same through the machine, and thereby decreasing the load on the subsequent drying stage.

I effect the application of this principle by effecting such rapid rotation of the individual fruit integers that the spinning thereof will, of itself, cause the moisture droplets to flow from the stem and calyx recesses to the cheeks of the fruit, from which they will be sprayed off as though by a centrifugal sprayer. As centrifugal force always acts outwardly, the liquid is necessarily driven outwardly so that there is no danger of its being forced into the core capillaries.

In the preferred embodiment of my invention, this spinning action is accompanied by a gentle jarring or jouncing of the fruit and I find that this aids in starting the liquid away from the nearly capillary recesses of the fruit, particularly in the case of fruit integers rotating substantially on their core axes and consequently having these nearly capillary passages substantially axially disposed.

Moreover, in order that these principles may be applied with ample energy to be thoroughly effective, particularly in the case of bruisable fruits, my invention contemplates restraining the fruit during the spinning and jouncing of the same so as to keep it from jumping about and becoming bruised.

Additionally in the preferred embodiments of my invention, to prevent the liquid droplets from being thrown from one fruit integer to the next, I provide for picking up the droplets as they are thrown off or gather and for carrying away of the same. The particular mode of effecting this end in the embodiment disclosed herein to illustrate my invention also effects a wet rubbing of the fruit thereby assuring removal therefrom of any particles of solid residues which may have been carried from the washing machine by the fruit integers.

In the accompanying drawings of this illustrative embodiment

Fig. 1 is a side elevation of drying apparatus for practicing a two-stage embodiment of the new method;

Fig. 2 is a plan view of the same, parts being removed or broken away to disclose the construction beneath;

Figs. 3 and 4 are elevations of the entrance and delivery end of the same;

Figure 5:
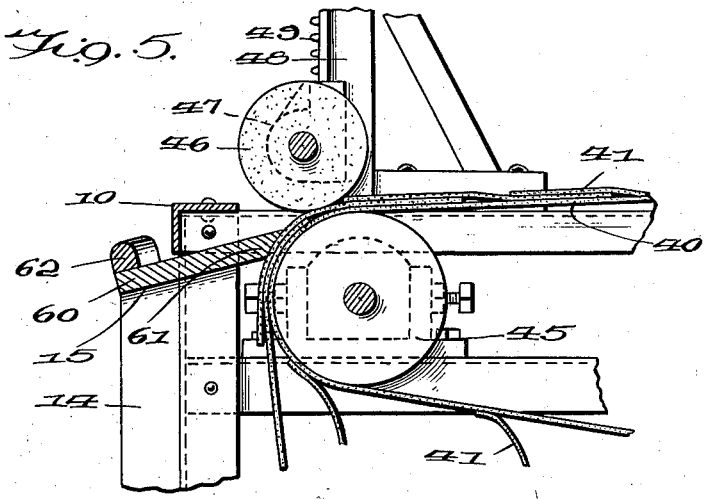
Fig. 5 is a sectional detail view of means for collecting and draining away liquid removed from the fruit.

In this illustrative embodiment the apparatus comprises a frame 10, preferably built up of structural members such as the angle members shown, bolted, rivetted or otherwise suitably secured together.

At its entrance end the apparatus is provided with a fruit-receiving means located to receive wet fruit delivered from a washer, which herein comprises the wooden ramp 11 carried by the ramp support consisting of the beveled block 12 secured to the member 13 of the frame 10. Lateral guide blocks 14 are also provided in the form shown and likewise secured to the frame 10 for guiding the fruit into the work passage of the apparatus. In the preferred embodiment for structural simplicity the upper ends 15 of the guide blocks 14 are beveled, as shown, to constitute means for supporting a drain trough as hereinafter described.

In the illustrative embodiment the rapid rotation for effecting centrifugal moisture removal is imparted to the fruit by means of a plurality of parallel adjacent cylindrical brushes 16, herein four in number, suitably rotatably mounted by the journals 17 and pedestals 18 secured to the frame 10, and preferably extending across rather than longitudinally of the apparatus so as to jounce the fruit by passing it from the crests of the brushes downwardly into the valleys between the brushes as the layer of fruit delivered by the ramp 11 traverses this spinning means.

As best shown in Fig. 1, the brushes 16, which are preferably of soft hair or fibre construction, are placed so closely adjacent one another that the fruit cannot pass through and as the brushes are rotated in the direction indicated by the arrows (clockwise as viewed in Fig. 1), the row of fruit lying in a valley between two brushes is caused to rotate rapidly and centrifugally discharge the moisture from its stem and calyx ends onto its cheeks whence the larger particles fly off tangentially. The feed of fruit to the machine being in substantially a continuous layer, each fruit integer is subjected to the same spinning action, and as it passes across the brushes from crest to valley the jouncing action further aids in starting the moisture from the stem and calyx ends, both by the jar overcoming capillary adhesion and by causing fruit which may have been rotating on its core axis to change its axis of rotation to one in which the stem and calyx ends are further removed from the axis of rotation.

As above mentioned, in order that the brushes 16 may be so rapidly rotated as to impart spin and jouncing to the fruit with ample energy to effect the desired end (with brushes of 4/ and 7/8" diameter, I have found a speed of somewhat over 400 R. P. M. to be suitable in the embodiment described) I contemplate restraining the fruit against jumping about and becoming bruised preferably by gently pressing down upon it throughout its travel across the brushes 16. In the embodiment disclosed, trailing means, as a heavy cloth, is employed for this purpose as described below.

I have also mentioned above that, particularly when drying dripping wet fruit, it is desirable to pick up and carry away the moisture drops discharged by the fruit.

In the preferred embodiment for simplicity I desire to employ as simple a means as possible for performing these functions and accordingly use a depending flexible absorbent wiper means, preferably moving counter to the direction of advance of the fruit, to both restrain the fruit from jumping and to pick up the drops of moisture and carry them to suitable means, as a wringer, for removing it therefrom.

As is described more fully hereinafter, the second stage of my invention preferably employs contact absorbent drying, using depending absorbent wiping cloths, and in line with my aim of simplifying the apparatus as much as possible, I prefer to simply continue the travel of these wiping cloths across the first stage brushes 16 as well, and have so shown the construction in the illustrative example.

At the delivery end of the centrifugal stage provision is made for transferring the fruit to the second drying stage, which, in the embodiment shown, is effected by providing a second ramp 20 (Fig. 1), herein a flat inclined wooden board suitably secured to the member 21 of the frame 10.

In the embodiment shown in which the wiper means 40—41 travels across both stages of the machine, this wiper means is allowed to trail across the intermediate delivery ramp as well and thus slows down the rolling of the fruit across the same, preventing bruising of the fruit, and maintaining it in a single layer evenly fed to the slower second stage of the machine without piling up.

The second stage of drying may be effected in any known or desired way, and the means for effecting this drying may be of any known or desired type or construction. In my preferred embodiment, however, I effect the second stage of drying in a manner particularly cooperating with the first drying stage, and by means particularly combining therewith to produce most effective drying and most simple and compact construction of the apparatus.

In the form shown the structure employed for the second stage of the apparatus could not be used alone to best advantage or in any combination in which dripping wet fruit might reach it, because such use would result in tracking of moisture through the same and mitigate against thorough drying of the fruit. However, I am enabled to use such drying means which is most effective once this tracking problem is overcome, because my centrifugal drying means initially disposes of substantially all drippable moisture and thereby avoids the tracking problem entirely.

As best shown in Fig. 1, this second stage of drying is preferably effected by positively rotating the fruit integers comparatively slowly, and simultaneously effecting removal of the residues of moisture therefrom by contact absorption. In the preferred embodiment the positive rotation of the fruit is effected by means of a live-roller conveyor, generally similar to the types of conveyors employed in grader or picker tables, herein comprising side chains 21 trained over idle sprockets 22 at the receiving end of the conveyor and on driving sprockets 23 at the delivery end thereof, and rotatably carrying between them a series of transverse live rollers 24 closely spaced to prevent dropping of fruit between the same. As clearly indicated in Fig. 1, on their active run these live rollers are caused to rotate as the conveyor is driven, hereby by rolling at their ends on the lateral trackways 25 carried by the side boards 26, and supported on the transverse bolsters 27, mounted on the frame members 28. The members 29 and 30 (Fig. 1) which are similar to the members 25 and 26, serve as a return-way for the live roller conveyor during its return or idle run. Suitable means is also provided at either side of the active run of the conveyor to confine the fruit carried thereby to the conveyor surface, herein in the form of wooden side rails 31 (Fig. 1) shown as extending the full length of the active run from the ramp 20 to the discharge end of the conveyor.

In operation the live roller conveyor 21—24 is driven clockwise as viewed in Fig. 1, at say 15 feet per minute, and the rolling of the free rollers 24 on the trackway 25 causes them to revolve clockwise as they advance. Thus fruit delivered over the ramp 20 into the valleys between the rolls 24 will itself be caused to revolve in a counter-clockwise direction as viewed in Fig. 1.

As above mentioned, I prefer to effect the drying of the fruit by contact absorption, and accordingly provide suitable contact absorption means. In the broader aspects of my invention various forms of contact absorption means may be used, but in my preferred embodiment this means is of the trailing wiping cloth type and of an improved construction enabling it to be more thoroughly wrung out by means such as wringer rolls, hereinafter described, than has been possible with prior constructions, thereby improving the operation of the dryer as a whole.

In forms of wiper dryers heretofore employed in attempts to dry fruit in a single stage, the wipers have been hung on cross-rods extending between side chains and the wringer rolls have been grooved to receive the cross-rods. This has resulted in leaving a wet streak across the drying cloths which spreads as soon as the cloths leave the wringer and thereby reduces their effectiveness as drying agents. In my improved construction I use as the wiper carrier a flat belt 40 (Fig. 1) preferably of rubber belting though other materials may be used, and rivet thereto at frequent intervals my depending wiper cloths 41. It will be appreciated that with prior cross-rod construction the cross-rods could not be spaced very closely together because to do so would require closer spacing of the rod-receiving grooves in the wringer rolls and decrease the efficiency of wringing. With my construction, however, the wiper cloths 41 may be spaced as closely as desired and in the illustrated embodiment are preferably spaced about six inches apart along the belt, which is much closer spacing than is practical with the old cross-rod construction, thereby increasing the drying capacity in a given length and enabling a marked decrease in space required, particularly when combined with my initial centrifugal stage.

In the embodiment shown the wiper-belt 40—41 is continuous in form and is trained about several idle rolls, herein the iron idler roll 42 near the delivery end of the machine, the wooden idler roll 43 near the ramp 20 (these two rolls positioning the belt so that the wipers will trail across the fruit on the conveyor 21—24), and the wooden idler roll 44 intermediate the upper run of the belt 40 which supports it during its return run. In addition, the wiper belt 40—41 is trained between a pair of wringer rolls, herein passing about a lower iron wringer roll 45 and between the latter and an aupper, rubber wringer roll 46 (see Figs. 1 and 5). As mentioned above, I prefer to employ the wiper means 40—41 not only as the contact absorption means for the second stage, but also as the fruit restraining and moisture pick-up means for the centrifugal stage. To this end the wringer 45—46 is located in the form shown above the entrance end of the machine, thus appropriately positioning that portion of the wiper means overlying the centrifugal stage in a simple manner.

In the preferred embodiment of my invention means is also provided for adjusting the pressure of the wringer rolls, consisting in the form shown, of sliding bearings 47 for one of the rolls, herein the rubber roll 46, carried by bearing couches 48, and tensioned by adjustable resilient means, as the spiral springs 49, adjusted by rotation of the tightener elements 50 which pass through the same and are secured at their lower ends by lock nuts 51 (Fig. 1), this tightening being effected by travel of the follower nuts 52 (Fig. 3), which are held against rotation by the walls of the couch channel as the elements 50 are rotated.

In order to effect maximum efficiency of the wipers 41 while minimizing the length of the machine, it is desirable to provide means for disposing of the liquid wrung from the wipers 41 without allowing it to pour down onto the fruit, and I have developed an improved arrangement for performing this function and smoothing the wipers 41 as they pass to the wringer 45—46 so as to facilitate complete wringing of the same.

As shown in Figs. 1, 2 and 5 this improved means consists of a drain board 60 having a beveled or tapered forward edge 61 disposed in contact with the wiper means 40—41 just before the latter enters the bight between the iron and rubber wringer rolls 45 and 46. The disposition of this board edge 61, it will be observed, smooths down the wipers 41 if they should not lie smoothly on the belt 40 for any reason, and the close contact of the edge 61 with the wipers 41 brought in from below the same assures that liquid squeezed from the wipers 41 at the bight of the rolls 45—46 will not run down over the wipers and onto the fruit beneath, but will be deflected from the wipers by the board 60, which is preferably inclined rearwardly as shown to facilitate this action. In the form shown this rearward inclination also enables the board 60 to be disposed horizontally in a direction transverse of the machine, while providing for lateral discharge of the drainage by simply securing a bead or wall 62 diagonally on the board 60 along which the liquid will flow from the end nearest the wringer to the end furthest therefrom due to the double incline effected by this novel and simple arrangement.

As heretofore mentioned, in order to support the drain trough 60—62 simply and effectively, the upper ends 15 of the lateral guide blocks 14 are bevelled at their tops at the proper inclination, as best shown in Fig. 1 and Fig. 4.

Figure 6:
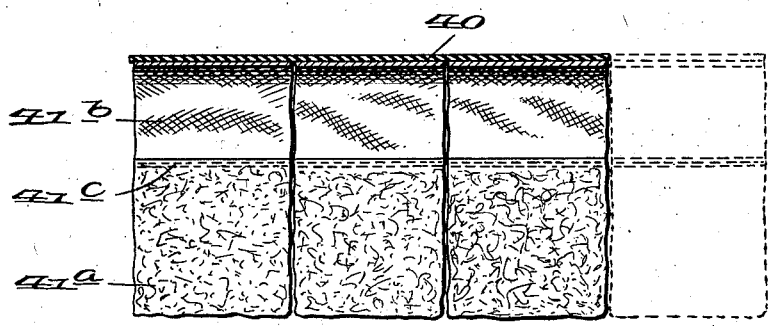
Fig. 6 is a detail view of one wiper unit.

Referring now to Fig. 6, as well as the other figures, it will be appreciated that aside from other advantages of my particular improved form of wiper means 40—41, the use of resilient material for the carrier belt 40, as rubber belting, provides a resilient surface to cooperate with the rubber wringer roll 46 in squeezing the liquid from the wipers 41, while greatly increasing the life of the wringer means by enabling its driving roll 45 to be of durable construction as the iron roll shown. As whatever driving wear occurs is distributed over the great area of the strong rubber belt 40, and as the rubber roller 46 is in effect a driven idler roller, the parts require but very infrequent renewal.

As has also been mentioned above, further novel features of my improved wiper means add greatly to the efficiency and wearability thereof. Thus, as shown in Fig. 6, my wiper elements 41 are built up of a major trailing portion of soft absorbent blanket-like material 41ª, secured to a minor strong securing portion 41ᵇ, herein of canvas, as by sewing at 41ᶜ. The strong securing portion 41ᵇ facilitates firm riveting or other securement to the rubber belt 40 and also reduces retention of liquid in portions of the wiper means which, if of blanket material, would simply add to the load on the wringer and be inactive as a fruit contacting part. The use of canvas or the like at these portions reduces the bulkiness of the wiper means, further facilitating close spacing of the wipers, as well as increasing the life of the wipers.

As further shown in Fig. 6, my improved wiper means has its wiper elements 41 made up in narrow unit sections. Thus assuming the unit section 41ª—41ᵇ—41ᶜ to be one foot wide, three of them would be secured edge to edge to a three foot wide rubber belt 40 for a small capacity machine; four of them to a four foot wide belt for a larger capacity machine, and so on. Thus this feature of my invention reduces the number of stock sizes of parts to be maintained on hand, but this is not its only function. Canvas when repeatedly wetted and dried shrinks materially, whereas the rubber belt 40 does not. Thus if the canvas 41ᵇ extended in one piece the full width of the belt, its shrinkage would cause curling or cupping of the belt. Relatively narrow widths of canvas 41ᵇ however, on the order of one foot width obviate such curling apparently because the reduced amount of shrinkage in each width is small enough to be compensated for by "giving" of the strips at the rewetting points.

While the various parts of my machine for practicing my new method may be driven in any suitable way, I prefer to have them chain-driven, as shown, to correlate their functions and relative speeds permanently in the most effective ratios. Thus in the form shown, I have indicated the several brushes 16 as interconnected by chain and sprocket means 65 for simultaneous equal rotation, and as driven by any suitable means, as an electric motor 66 connected thereto for proper speed of drive by the belt 67 running on suitable pulleys 68 and 69. A reduced speed is imparted to a counter-shaft 70 in the form shown by means of the reducing chain drive 71, and the driving roll 45 of the wringer in the form shown is driven from this counter-shaft by the further chain and sprocket drive 72. In order to obtain a still slower driving speed for the live roll conveyor of the second drying stage, a second counter-shaft 73 is driven from the counter-shaft 70 through a reducing drive 74 and in turn drives the live roll conveyor through an appropriate chain and sprocket means 75. Drives for other units of packing house equipment may also be taken off the various shafts as desired, and as illustrative thereof I have shown at 76 a drive for a fruit washing machine or other apparatus taken off the counter-shaft 73.

It will now be apparent that the apparatus herein disclosed is particularly adapted to practice my new and improved method. As fruit is supplied to the machine over the receiving ramp 11, it is first rapidly rotated and gently jounced as it passes over the rapidly turning transverse brushes 16 and under the wipers 41, which are relatively heavy with moisture and thus particularly effective to hold down the fruit and prevent jumping and bruising of the same. At the same time the wipers 41 wet rub the fruit and also pick up the larger moisture drops as they collect or are discharged from the fruit by centrifugal force, carrying the liquid to the wringer 45—46 where the drainage is disposed of by way of the trough 60—61 without being permitted to drop onto the fruit. The no longer dripping wet fruit delivered from the brushes 16 passing down the intermediate ramp 20 and controlled in this passage by the overlying counter-moving wipers 41, then reaches the live roller conveyor 24 by which it is slowly rotated and carried under progressively drier and drier wipers 41 in the final drying operation of the disclosed embodiment. In the preferred arrangement, the live roller conveyor in combination with the counter-moving wipers 41 insures a most positive and continuous rotation of the fruit as both elements impart counter-clockwise rotation to the fruit (as viewed in Fig. 1) and thus aid one another in contradistinction to any opposing action. The construction of the wringer means 45—46 and the wiper means 40—41 insures maximum extraction of moisture therefrom and thus in a single wringing operation so thoroughly dries the wipers 41 that full drying of the fruit is achieved and even a measure of polishing. The fruit now essentially dried is delivered from the live roller conveyor 24 in the form shown down a delivery ramp 77 for transferring the fruit to further packing equipment, as a roller grader, sizing machine or the like.

While I have described in detail preferred embodiments of my invention for the purpose of exemplifying the same, it is to be expressly understood that my invention in its broader aspects is not limited thereto but may be practiced in other ways, and by other means than those disclosed, which are to be considered as purely illustrative and not restrictively.

I claim:

1. A fruit drying machine for surface-drying dripping wet fruit which substantially avoids tracking of liquid to the dry end of the machine, comprising an initial drying section embodying a plurality of high speed rotary brushes adapted to impart rapid spinning movement to the fruit to discharge large moisture drops therefrom, and a second drying section to which the no longer dripping wet fruit is passed comprising a live-roll conveyor and a counter moving series of depending absorbent wiper means overlying the same to contact and absorb residual moisture from the fruit, said wiper means extending in part over said rotating brushes.

2. A fruit drying machine for surface-drying dripping wet fruit which substantially avoids tracking of liquid to the dry end of the machine, comprising an initial drying section embodying conveying means adapted to impart rapid spinning movement to the fruit to discharge large moisture drops therefrom, and a second drying section to which the no longer dripping wet fruit is passed comprising a live-roll conveyor and a counter-moving series of depending absorbent wiper means overlying the same to contact and absorb residual moisture from the fruit, said counter moving absorbent wiper means also passing over the fruit being rotated in said first drying section to pick up moisture discharged therefrom and bear upon the fruit to prevent pitching and bruising of the same.

3. A fruit drying machine for surface drying dripping wet fruit comprising an initial drying section for rapidly rotating the fruit at sufficiently high surface speeds to discharge the larger drops of liquid therefrom by centrifugal action, a secondary drying section comprising a live-roll conveyor for moving the fruit to the discharge end of the machine and for slowly revolving the fruit to expose all surfaces thereof, and an absorbent wiping member engaging the fruit in the secondary drying section for wiping the fruit dry, said wiping member extending over the initial drying section and acting to bear gently upon the fruit to prevent pitching and bruising of the fruit therein.

4. A fruit drying machine for surface drying dripping wet fruit comprising an initial drying section for rapidly rotating the fruit at sufficiently high surface speeds to discharge the larger drops of liquid therefrom by centrifugal action, a secondary drying section comprising a live-roll conveyor for moving the fruit to the discharge end of the machine and for slowly revolving the fruit to expose all surfaces thereof, and an absorbent wiping member engaging the fruit in the secondary drying section for wiping the fruit dry, said wiping member presenting a series of pendant absorbent curtains extending over the fruit in the initial drying section acting to prevent pitching and bruising of the fruit therein as well as to absorb moisture centrifugally discharged from the fruit in said initial drying section.

EDWIN M. WAYLAND.